United States Patent [19]
Chen et al.

[11] Patent Number: 6,144,180
[45] Date of Patent: Nov. 7, 2000

[54] MOBILE ROBOT

[76] Inventors: Chun-Ta Chen, No. 202, San-To-San Rd., Ling-Ya Dist.; Yu-An Hsieh, No. 15, Lane 52, Tsai-Kung-I Rd., Tso-Ying Dist., both of Kaoshiung City, Taiwan

[21] Appl. No.: 09/351,078

[22] Filed: Jul. 9, 1999

[51] Int. Cl.[7] .................................................. B64C 13/18
[52] U.S. Cl. .............. 318/587; 318/568.11; 318/568.12; 318/568.16; 318/568.1; 901/9; 901/1
[58] Field of Search ............................. 318/587, 568.11, 318/568.12, 568.16, 568.1; 901/1, 9; 395/80; 364/167.02

[56] References Cited

U.S. PATENT DOCUMENTS 5,685,383  11/1997  Ferrante ................................. 901/1
6,021,363  2/2000  Nishikawa et al. ................ 318/568.11

*Primary Examiner*—Karen Masih
*Attorney, Agent, or Firm*—Trop, Pruner & Hu, P.C.

[57] ABSTRACT

A robot includes a robot body, a pair of lift arms mounted pivotally on the robot body, a pair of leg support arms mounted pivotally on the lift arms, and a pair of wheeled leg assemblies mounted pivotally on each of the leg support arms. Each of the leg support arms is rotatable to turn one of the wheeled leg assemblies, which rests on the ground at the back of the other one of the wheeled leg assemblies, to a position in front of the other one of the wheeled leg assemblies, thereby moving forward the robot body. The lift arms are turnable upward or downward relative to the leg support arms to lift or lower the robot body.

17 Claims, 10 Drawing Sheets

MOBILE ROBOT

BACKGROUND OF THE INVENTION

1. Field of the invention

This invention relates to a mobile robot, more particularly to a robot which is capable of moving on various types of terrain.

2. Description of the related art

It has been recognized that utilization of mobile robots in the automated carrying of weight can be very time and cost effective. Conventional mobile robots generally utilize roller wheels so as to be able to move on a planar surface. Such arrangement, however, is not suitable for moving on a muddy surface or on a rough surface such as graveled paths. Further, the mobile robots are unable to move up and down along a slope or on a stair.

SUMMARY OF THE INVENTION

Therefore, it is an object of the present invention to provide a robot that is capable of moving on various types of terrain.

Accordingly, a robot of the present invention comprises: a robot body having two opposite sides; a pair of leg support arms pivotally mounted on the two opposite sides of the robot body for rotation about horizontal axes, each of the leg support arms having two diametrically opposite outer ends relative to the horizontal axes; and a pair of wheeled leg assemblies mounted on each of the leg support arms at the outer ends, respectively, each of the leg support arms being rotatable to turn upward and forward one of the wheeled leg assemblies, which rests on the ground at the back of the other one of the wheeled leg assemblies, to a position in front of the other one of the wheeled leg assemblies, thereby moving forward the robot body.

According to another aspect of the present invention, a robot comprises: a robot body having two opposite sides; a pair of lift arms turnable about horizontal axes relative to the robot body, the lift arms having first ends mounted pivotally on the opposite sides of the robot body and second ends extending radially outward from the first ends; a pair of leg support arms mounted pivotally on the second ends of the lift arms, respectively, for turning about horizontal axes and having two diametrically opposite outer ends; and a pair of wheeled leg assemblies mounted on each of the leg support arms at the outer ends, respectively, the lift arms being turnable upward or downward from the leg support arms to lift or lower the robot body.

BRIEF DESCRIPTION OF THE DRAWINGS

In drawings which illustrate an embodiment of the invention.

DETAILED DESCRIPTION OF THE PREFERRED EMBODIMENT

Figure 1:
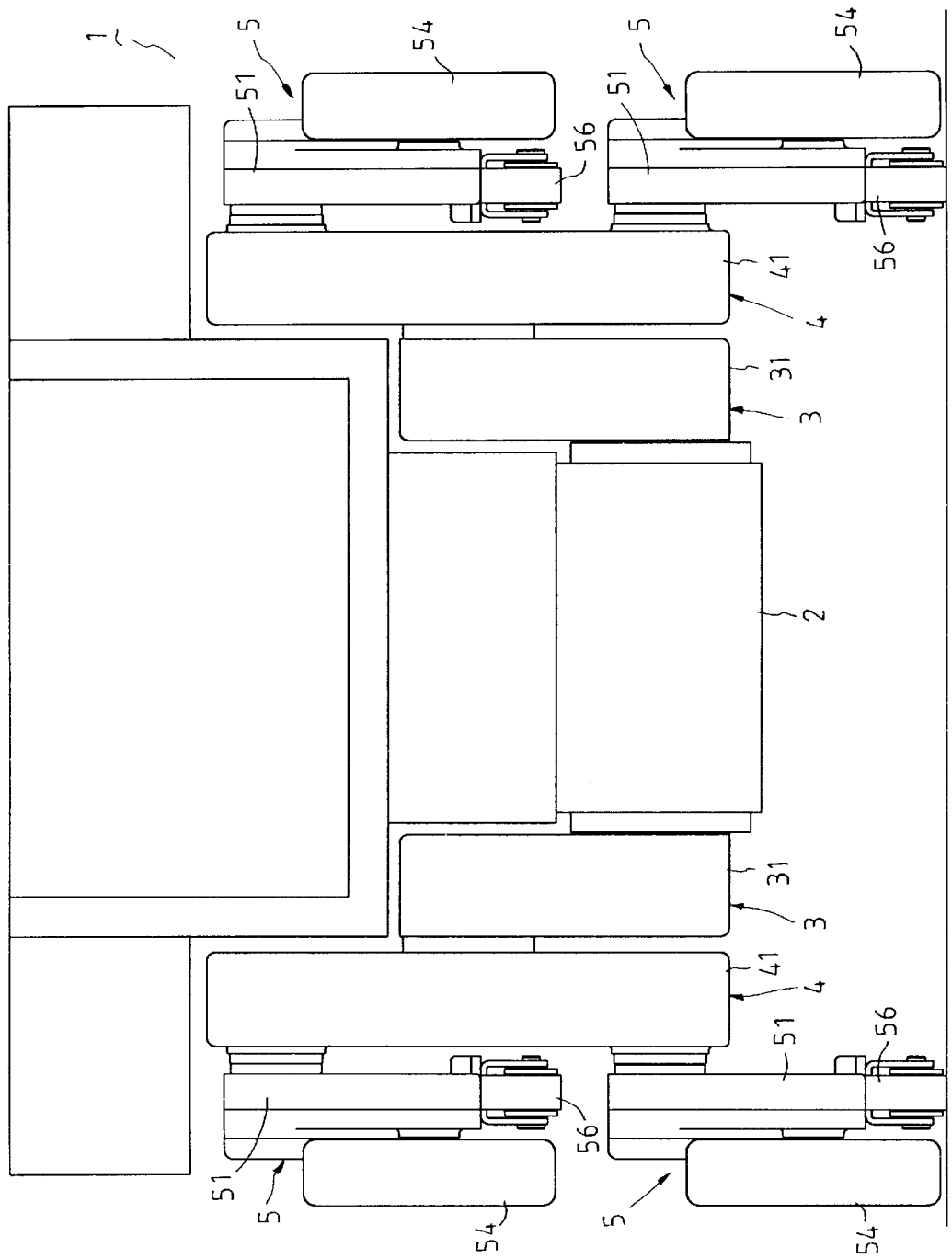
FIG. 1 is a rear schematic view of a robot embodying this invention.

FIG. 1 illustrates a robot 1 embodying this invention. The robot 1 includes a robot body 2 having two opposite sides, a pair of lift arms 3 which are mounted respectively on the two opposite sides of the robot body 2 and each of which has a hollow first housing 31, a pair of leg support arms 4 which are mounted respectively on the first housings 31 and each of which has a hollow second housing 41, a pair of wheeled leg assemblies 5 which are mounted respectively on the two opposite outer ends of each second housing 41 and each of which has a hollow third housing 51, a wheel 54 mounted on one end of each third housing 51, and a crawler tractor 56 mounted on a bottom of each third housing 51.

Figure 2:
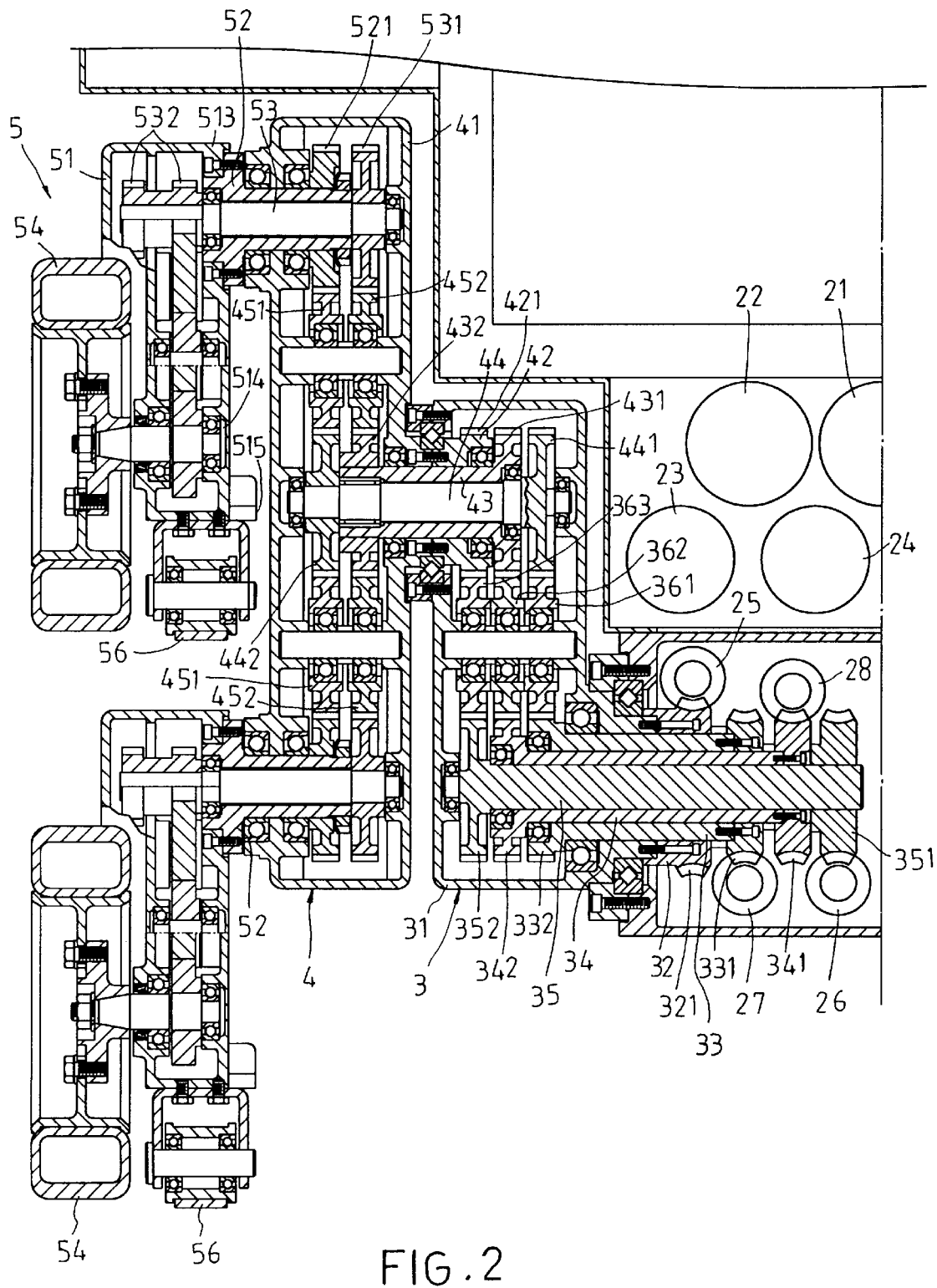
FIG. 2 is a fragmentary cross-sectional view of the robot of FIG. 1.

Referring now to FIG. 2, in combination with FIG. 1, the robot 1 of this invention includes a first motor 21, a second motor 22, and a third motor 23 mounted on the robot body 2 for driving the lift arms 3, the leg support arms 4, and the wheeled leg assemblies 5, respectively, and a fourth motor 24 for driving the wheels 54 and the crawler tractors 56.

First, second, third, and fourth main shafts 32, 33, 34, 35, are disposed concentrically one around the other, and are mounted on each side of the robot body 2. Each first main shaft 32 has two opposite ends with one end being securely connected to the first housing 31 of the corresponding one of the lift arms 3 and the other end being connected to a first driven gear 321 driven by the first motor 21 via a first worm gear 25 disposed inside the robot body 2. Each second main shaft 33 is inserted into the first main shaft 32, and has two opposite ends extending outwardly of the two opposite ends of the first main shaft 32 and connected to a second driven gear 331 disposed inside the robot body 2 and a first output gear 332 disposed inside the first housing 31, respectively. Each second driven gear 331 is driven by the third motor 23 via a second worm gear 27 disposed inside the robot body 2. Each third main shaft 34 is inserted into the second main shaft 33, and has two opposite ends extending outwardly of the two opposite ends of the second main shaft 33 and connected to a third driven gear 341 disposed inside the robot body 2 and a second output gear 342 disposed inside the first housing 31, respectively. Each third driven gear 341 is driven by the fourth motor 24 via a third worm gear 28 disposed inside the robot body 2. Each fourth main shaft 35 is inserted into the third main shaft 34, and has two opposite ends extending outwardly of the third main shaft 34 and connected to a fourth driven gear 351 disposed inside the robot body 2 and a third output gear 352 disposed inside the first housing 31. Each fourth driven gear 351 is driven by the second motor 22 via a fourth worm gear 26 disposed inside the robot body 2.

Two ends of the first housing 31 of each lift arm 3 are pivotally mounted on the corresponding side of the robot body 2 and the corresponding second housing 41 of the leg support arms 4 between two diametrically opposite outer ends of the leg support arms 4, so that the lift arms 3 are turnable relative to the robot body 2 and the leg support arms 4.

A support arm shaft 42, a first wheel shaft 43, and a first leg shaft 44 are disposed concentrically one around the other, and are mounted on the other end of the first housing 31 of each lift arm 3 opposite to the first, second, third and fourth main shafts 32, 33, 34, 35. Each support arm shaft 42 has two opposite ends with one end being securely connected to the second housing 41 of the corresponding leg support arm 4 and the other end being connected to a gear 421 driven by the third output gear 352 via a third transmitting gear 363 disposed inside the second housing 41, so that each leg support arm 4 is turnable along with the support arm shafts 42, and is rotatable relative to the first housings 31. Each first wheel shaft 43 is inserted into the support arm shaft 42, and has two opposite ends extending outwardly of the two opposite ends of the support arm shaft 42 and connected to a gear 431 disposed inside the first housing 31 and a gear 432 disposed inside the second housing 41, respectively. Each gear 431 is driven by the second output gear 342 via a second transmitting gear 362 disposed inside the housing 3. Each first leg shaft 44 is inserted into the first wheel shaft 43, and has two opposite ends extending outwardly of the two opposite ends of the first wheel shaft 43 and connected to a gear 441 disposed inside the first housing 31 and a gear 442 disposed inside the second housing 41, respectively. Each gear 441 is driven by the first output gear 332 via a first transmitting gear 361 disposed inside the first housing 31.

A second leg shaft 52 and a second wheel shaft 53 are disposed concentrically one around the other, and are mounted on each end of the second housing 41 of each leg support arm 4. Each second leg shaft 52 has two opposite ends with one end being securely connected to the third housing 51 of the corresponding wheeled leg assembly 5 and the other end being connected to a gear 521 driven by the gear 442 via a fourth transmitting gear 451 disposed inside the second housing 41, so that the third housing 51 is turnable along with the second leg shaft 52, and is rotatable relative to the corresponding leg support arm 4. Each second wheel shaft 53 is inserted into the second leg shaft 52, and has two opposite ends extending outwardly of the two opposite ends of the second leg shaft 52 and connected to a gear 531 disposed inside the second housing 41 and two gears 532 disposed inside the third housing 51. Each gear 531 is driven by the gear 432 via a fifth transmitting gear 452 disposed inside the second housing 41.

Figure 3:
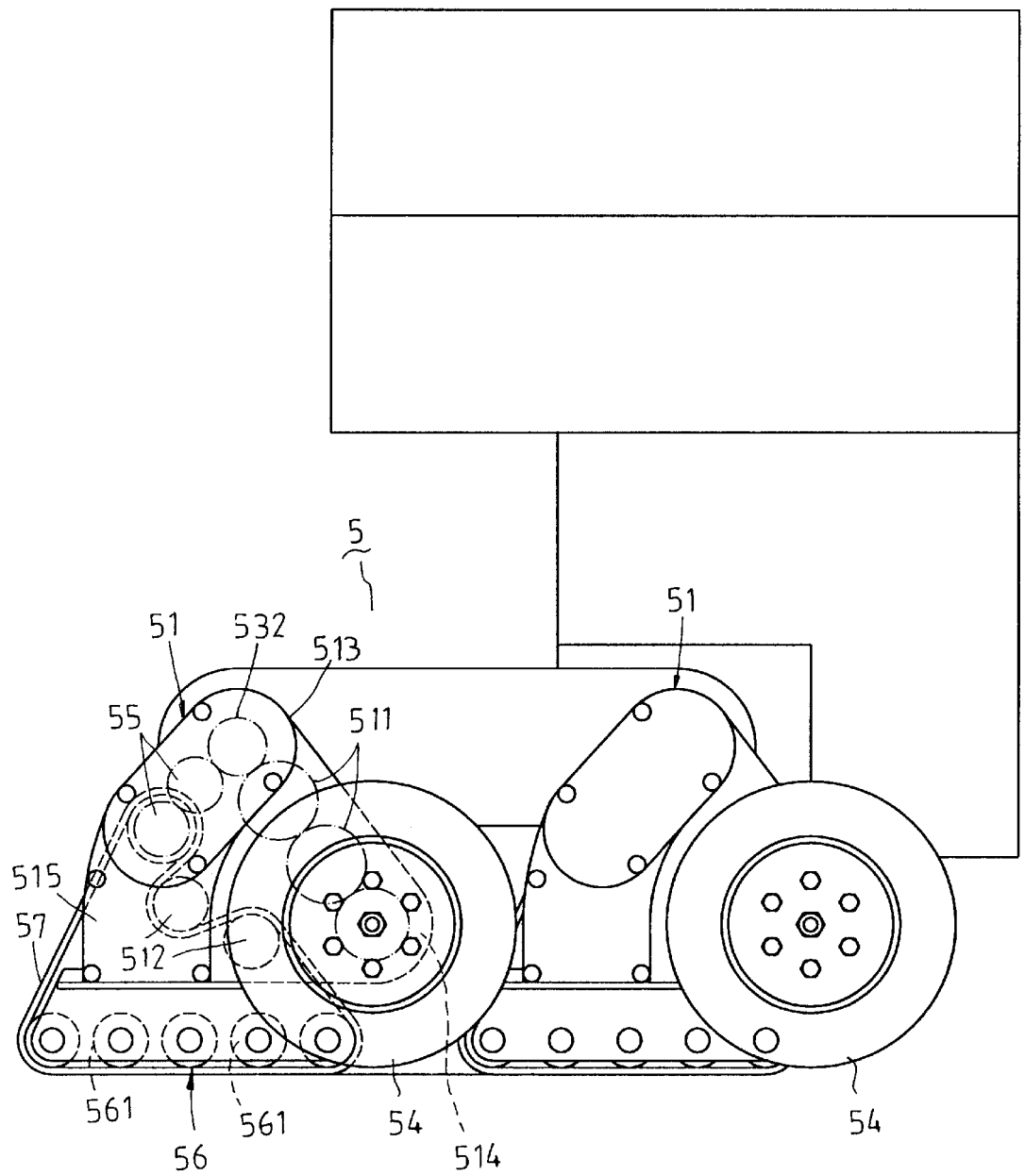
FIG. 3 is a schematic side view of the robot of FIG. 1.

Referring now to FIG. 3 in combination with FIG. 2, the third housing 51 of each wheeled leg assembly 5 is substantially triangular in shape, and has a mounting end 513 mounted pivotally on the second housing 41 and two angularly spaced apart radially outward ends 514, 515 extending outward from the mounting end 513. Each wheel 54 and each crawler tractor 56 are mounted pivotally on the radially outward ends 514, 515 of the third housing 51, respectively. The wheel 54 and the crawler tractor 56 can be placed in contact with the ground by turning the third housing 51. Each wheel 54 is driven by one of the two gears 532, which are driven by the second wheel shaft 53, via a first transmission mechanism 511 containing two transmission wheels. The other gear 532 drives the corresponding crawler tractor 56. Each crawler tractor 56 includes a plurality of sprocket rollers 561 mounted on the third housing 51, a sprocket chain 57 passing over and engaging the sprocket rollers 561, and a transmission wheel 55 engaging the sprocket chain 57 and driven by the other gear 532. Two tension adjustment rollers 512 are connected to the sprocket chain 57.

The advantages of the above described robot 1 of this invention can be better illustrated in the following examples shown in FIGS. 4 to 9.

Figure 4:
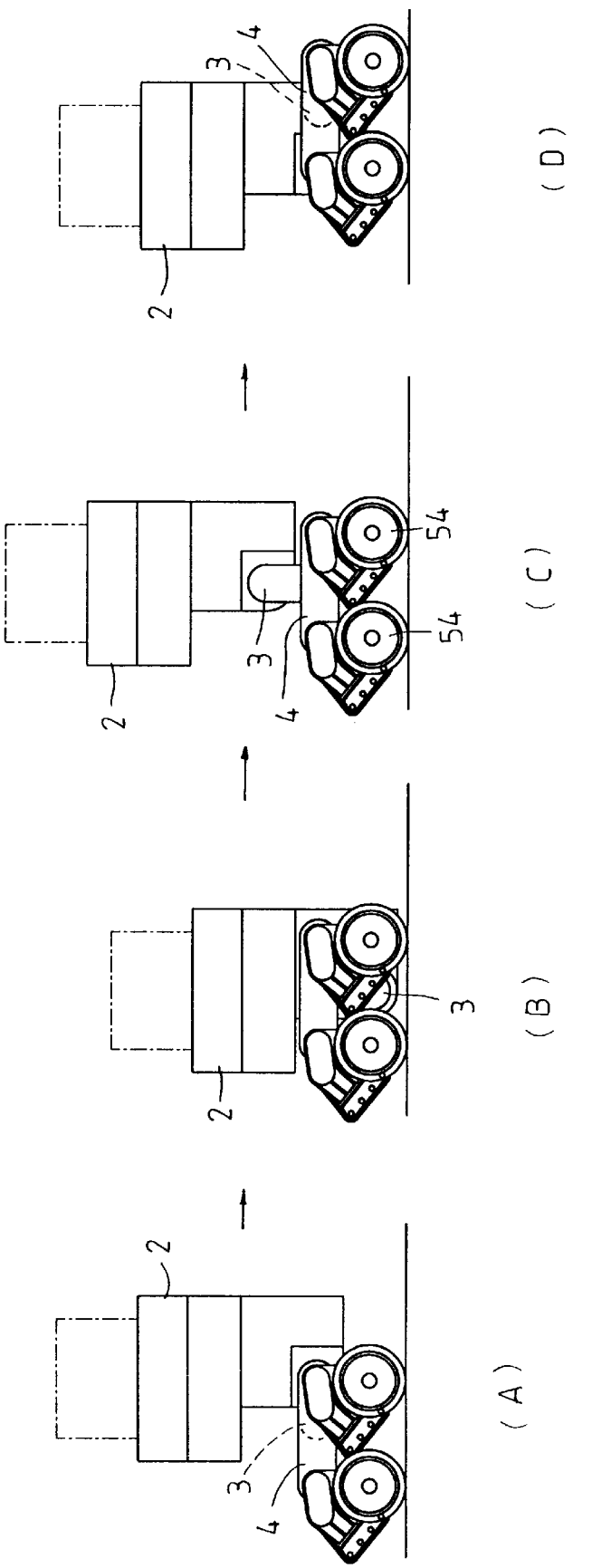
FIG. 4 illustrates a first operating mode of the robot of FIG. 1.
Figure 5:
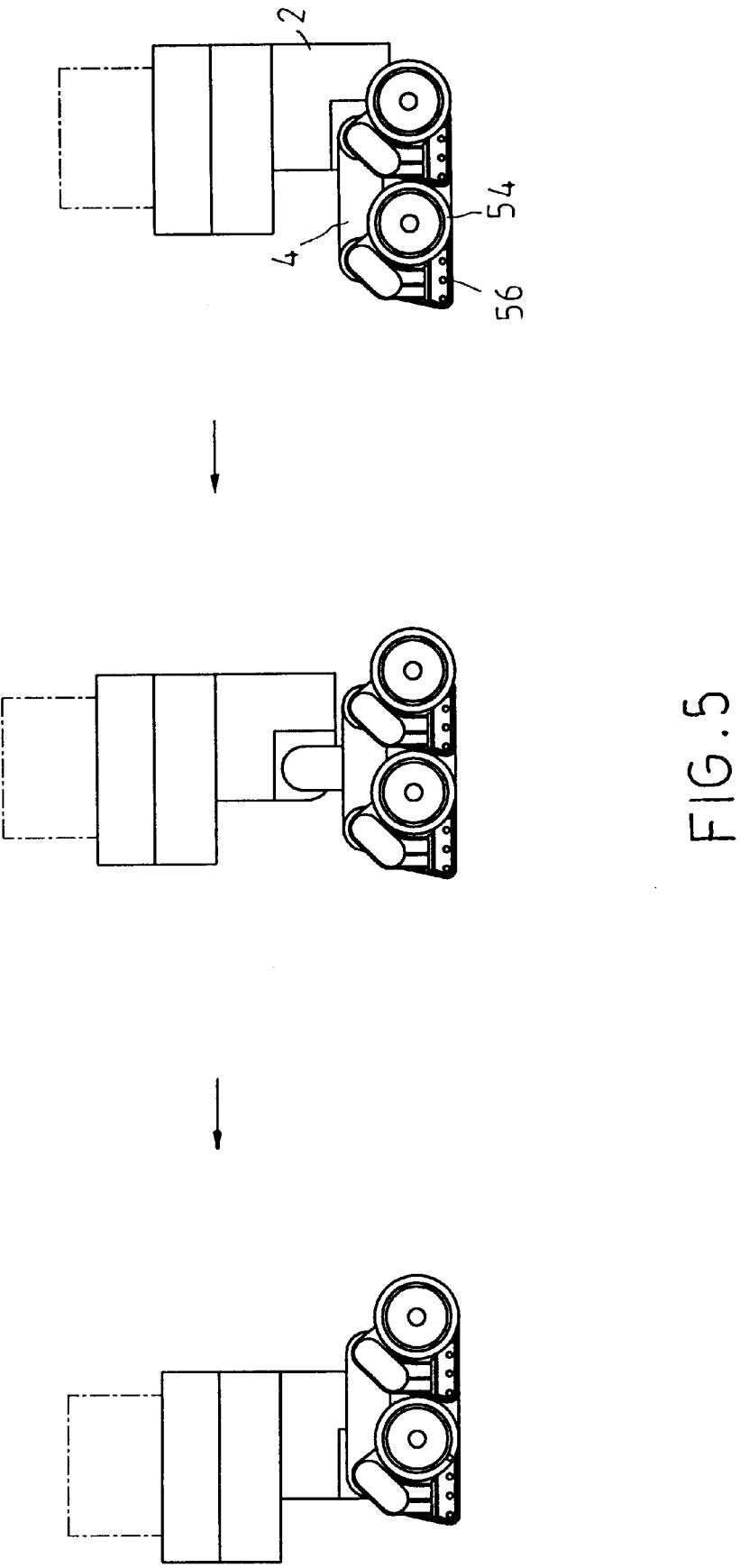
FIG. 5 illustrates a second operating mode of the robot of FIG. 1.

As illustrated in FIG. 4, the third motor 23 of the robot 1 is actuated to turn the third housings 51 relative to the leg support arms 4 to lift the crawler tractors 56 up and place the wheels 54 on the ground. The wheels 54 are then driven by the fourth motor 24 so as to move the robot 1 horizontally on the ground. The robot body 2 loaded with an object (illustrated using broken lines in the figure) can be lowered or lifted by actuation of the first motor 21. When the lift arms 3 turn downward relative to the leg support arms 4 in stage (B), the robot body 2 is lowered. When the lift arms 3 turn upward relative to the leg support arms 4 in stage (C), the robot body 2 is lifted. On the other hand, when the robot 1 is to be moved on a graveled or sandy ground surface, the third housings 51 can be turned again to lift slightly the wheels 5 and to place the crawler tractor 56 on the ground surface, as shown in FIG. 5.

Figure 6:
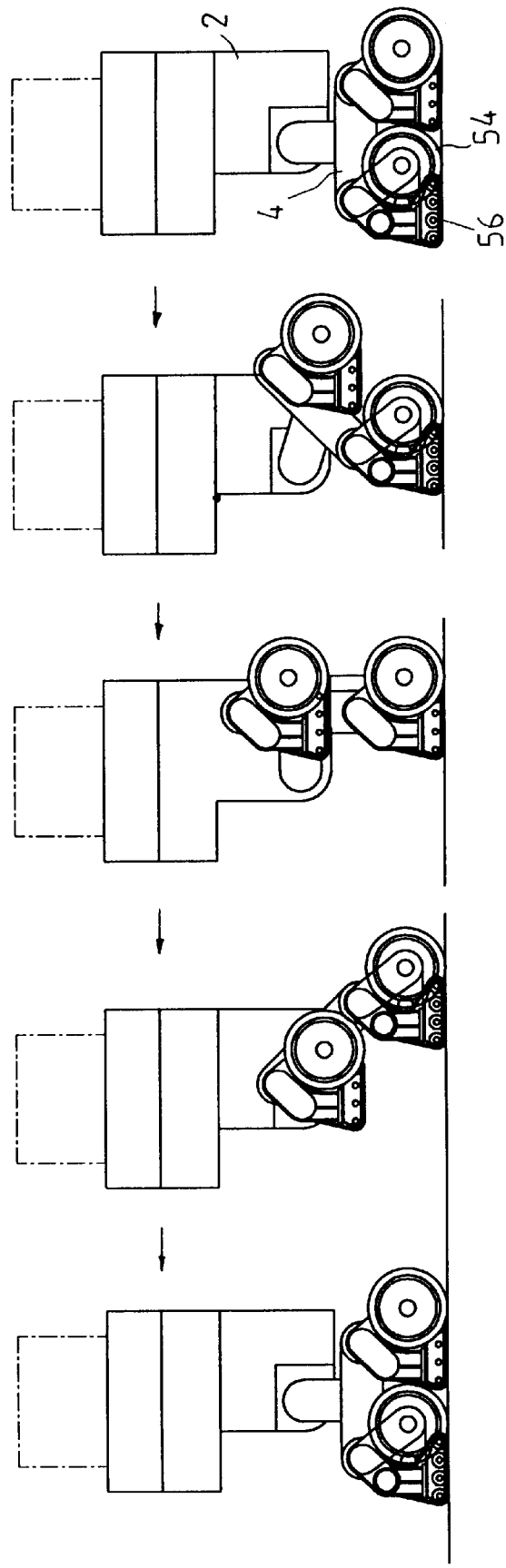
FIG. 6 illustrates a third operating mode of the robot of FIG. 1.
Figure 7:
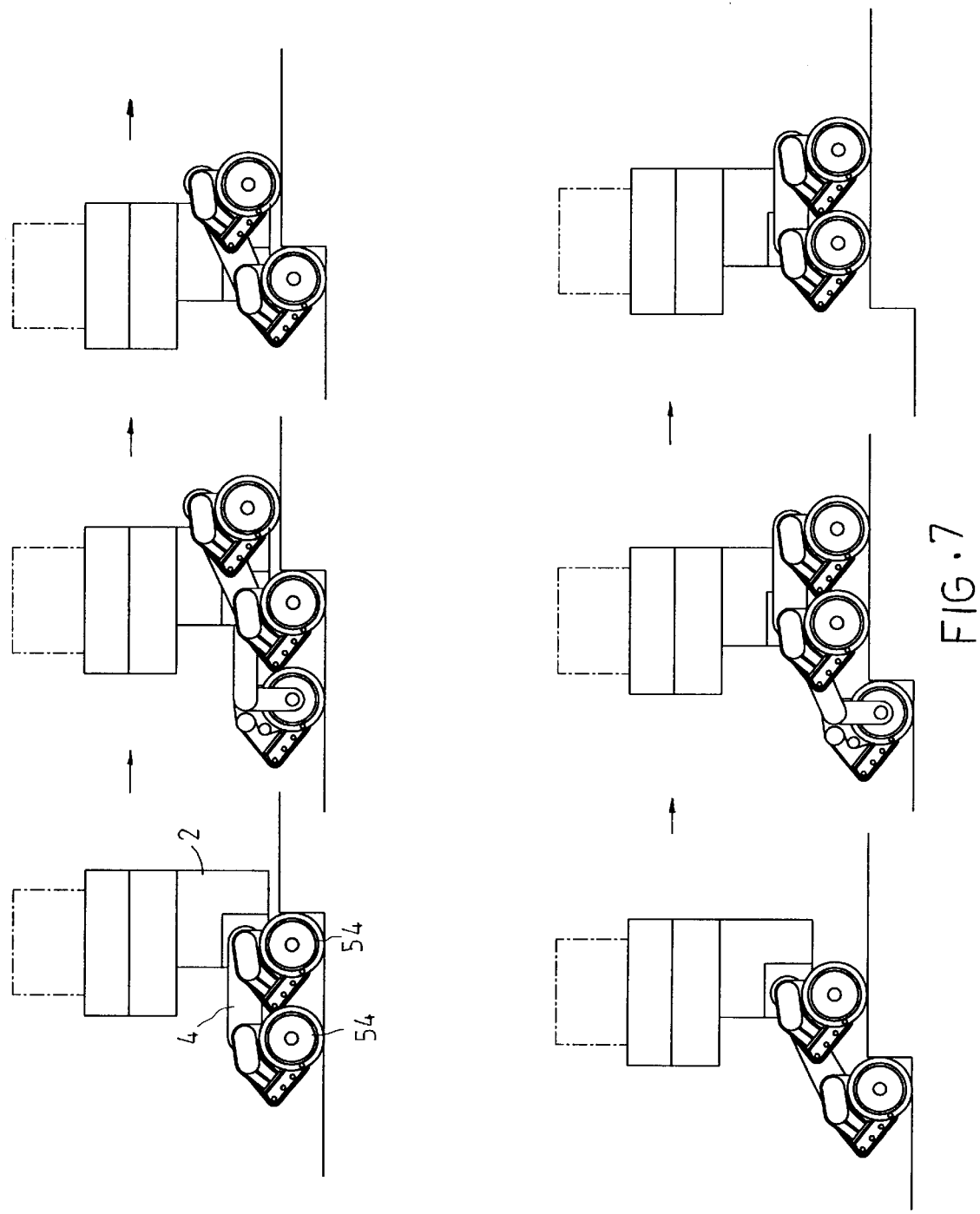
FIG. 7 illustrates a fourth operating mode of the robot of FIG. 1.

As shown in FIG. 6, when the robot 1 is to be moved on the ground having a muddy or greasy surface, the second motor 22 is actuated to rotate the leg support arms 4, and the third motor 23 is also actuated to rotate the wheeled leg assemblies 5 in operation with the leg support arms 4. Thus, the crawler tractors 56 of one of the wheeled leg assemblies 5 rest on the ground, while the other wheeled leg assemblies 5 move upward from a rear position and turn forward and then downward to touch the ground once again in front of the resting crawler tractors 56. The repetition of the operation as such simulates a walking movement of a foot. When a step is encountered, such movement permits the wheeled leg assemblies 5 of the robot 1 to step up and down, as shown in FIG. 7.

Figure 8:
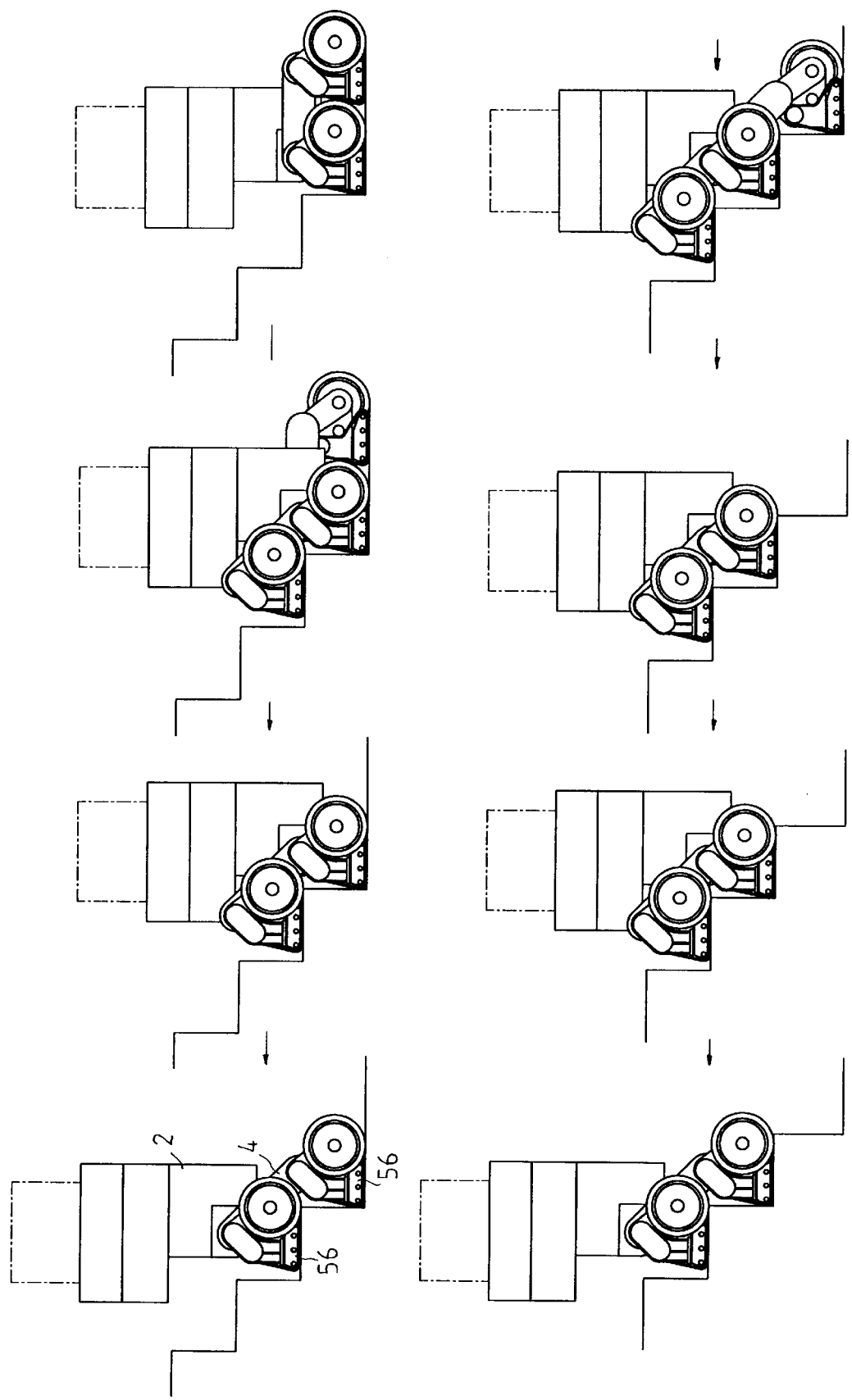
FIG. 8 illustrates a fifth operating mode of the robot of FIG. 1.
Figure 9:
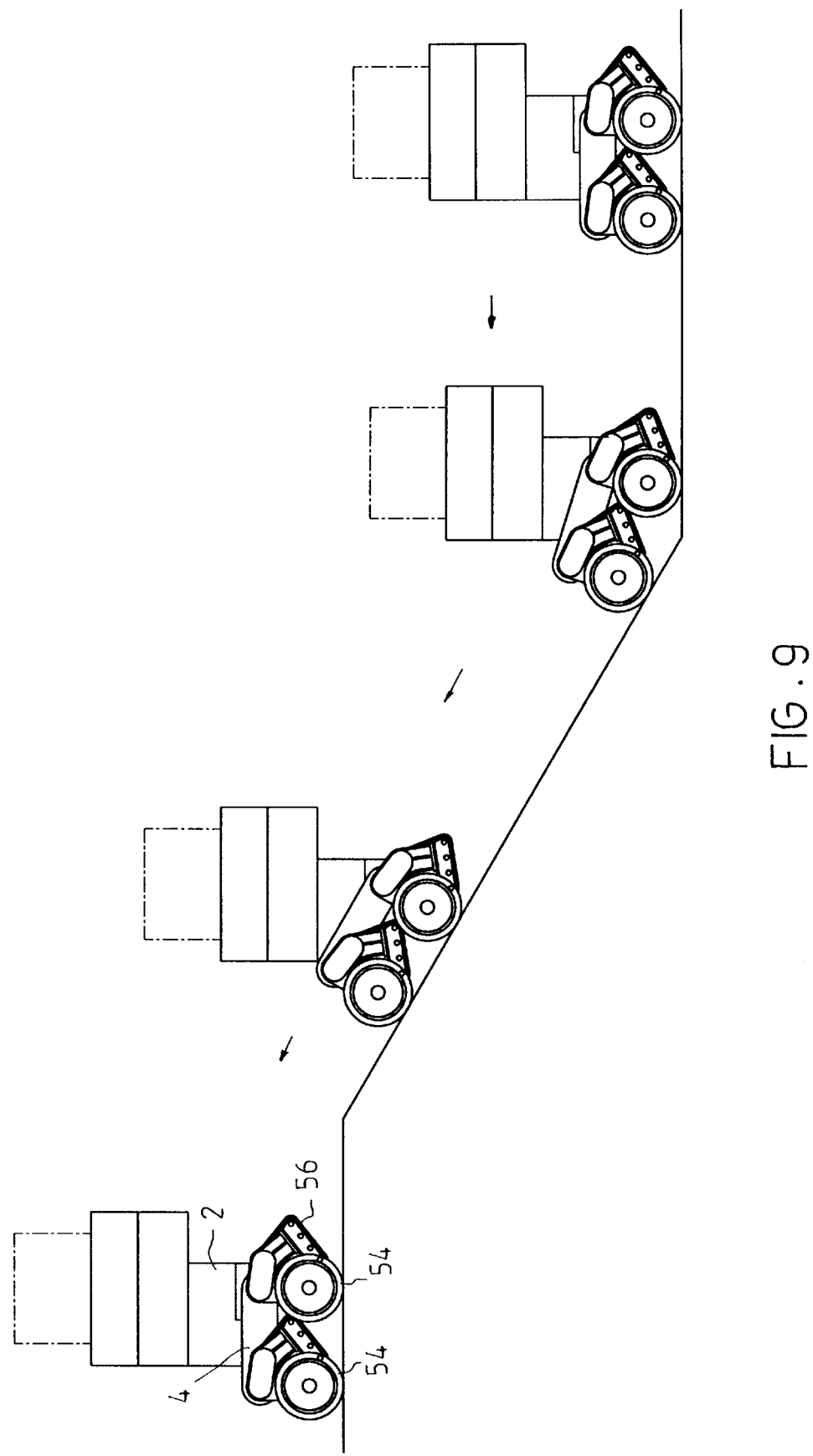
FIG. 9 illustrates a sixth operation of the robot of FIG. 1.

As shown in FIG. 8, the robot 1 moves along a stair with the assistance of a distance measuring sensor (not shown) . When the sensor detects the presence of a step, the robot 1 performs a walking or stepping operating mode, and the lift arms 3 serve to lift the robot body 2 step by step. As shown in FIG. 9, the robot 1 climbs upward along a slope by using a level sensor (not shown). The level sensor controls the second motor 22 to cooperate with the third motor 23 so that the leg support arms 4 and the third housing 51 can be maintained at appropriated angles to keep the robot body 2 level.

Figure 10:
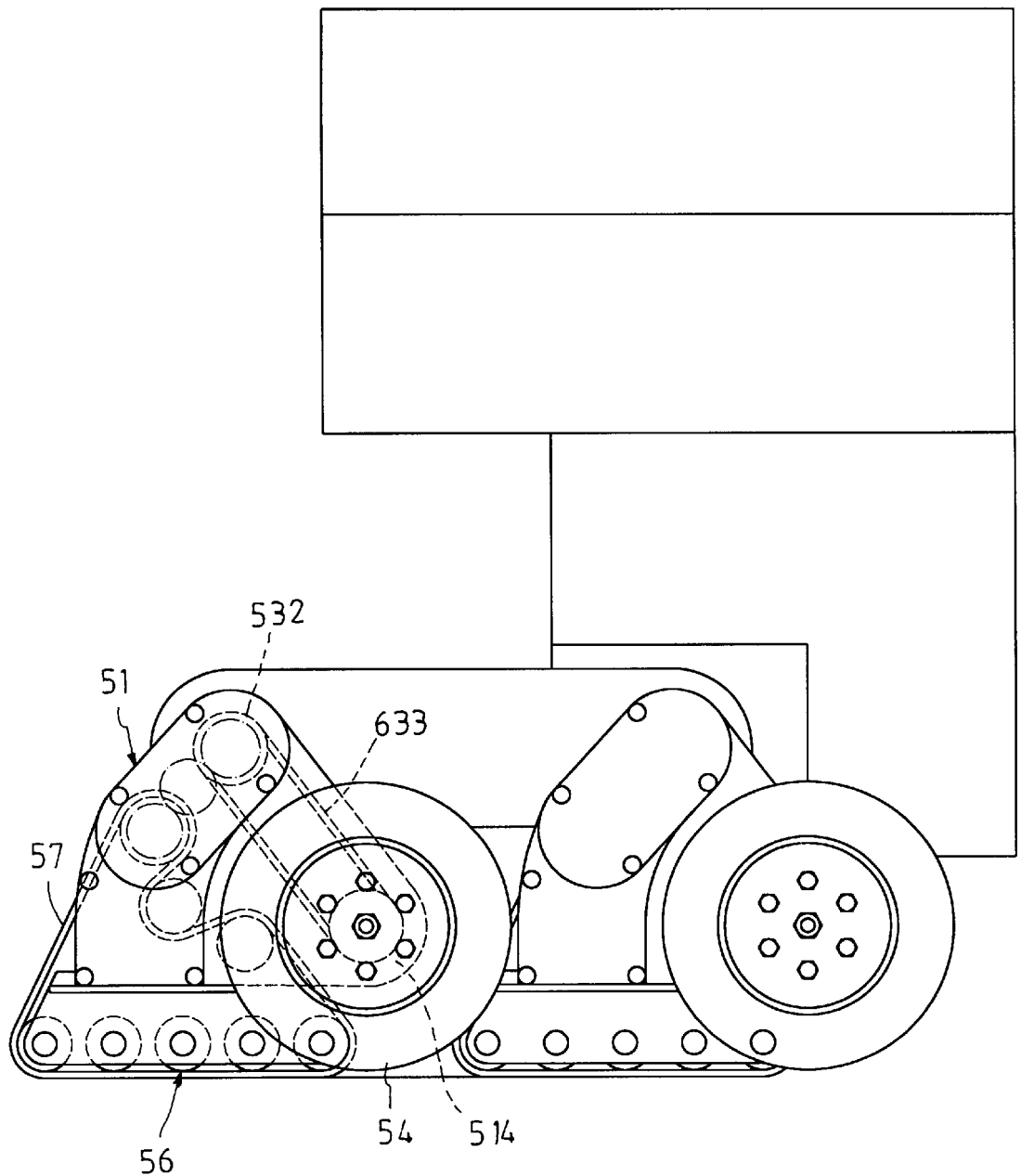
FIG. 10 is a schematic side view of another embodiment of the robot of FIG. 1.

FIG. 10 illustrates another embodiment of the robot 1 of this invention which has a configuration similar to that of FIG. 3 except that each wheel 54 is driven by the gear 532 via a transmission belt 633.

The robot 1 of this invention can be used in a wheeled chair to render the latter to be more flexible in use.

With the invention thus explained, it is apparent that various modifications and variations can be made without departing from the spirit of the present invention. It is therefore intended that the invention be limited only as recited in the appended claims.

We claim:
1. A robot comprising:
a robot body having two opposite sides;
a pair of leg support arms pivotally mounted on said two opposite sides of said robot body for rotation about horizontal axes, each of said leg support arms having two diametrically opposite outer ends relative to said horizontal axes; and
a pair of wheeled leg assemblies mounted on each of said leg support arms at said outer ends, respectively, each of said leg support arms being rotatable to turn upward and downward one of said wheeled leg assemblies which rests on the ground at the back of the other one of said wheeled leg assemblies to a position in front of said other one of said wheeled leg assemblies, thereby moving forward said robot body.

2. The robot as claimed in claim 1, wherein each of said wheeled leg assemblies includes a housing which has a mounting end mounted pivotally on one of said opposite outer ends of each of said leg support arms and which has a radially outward end extending outward from said mounting end, and a wheel mounted rotatably on said radially outward end.

3. The robot as claimed in claim 1, wherein each of said wheeled leg assemblies includes a housing which has a mounting end mounted pivotally on one of said opposite outer ends of each of said leg support arms and which has a radially outward end extending outward from said mounting end, and a crawler tractor mounted on said radially outward end.

4. The robot as claimed in claim 1, wherein each of said wheeled leg assemblies includes a substantially triangular housing which has a mounting end mounted pivotally on one of said opposite outer ends of each of said leg support arms and which has two angularly spaced radially outward ends extending outward from said mounting end, a wheel mounted on one of said radially outward ends, and a crawler tractor mounted on the other one of said radially outward ends, said housing being turnable relative to a corresponding one of said leg support arms to place one of said wheel and said crawler tractor in contact with the ground.

5. The robot as claimed in claim 1, further comprising a pair of lift arms having first ends mounted pivotally on said opposite sides of said robot body and second ends extending radially outward from said first ends, said leg support arms being mounted on said robot body by being pivoted to said second ends of said lift arms, respectively, between said diametrically opposite outer ends of said leg support arms, said lift arms being turnable upward and downward relative to said leg support arms to lift or lower said robot body.

6. The robot as claimed in claim 5, further comprising a first motor, a second motor, and a third motor mounted on said robot body for driving said lift arms, said leg support arms, and said housings of said wheeled leg assemblies, respectively, and a fourth motor mounted on said robot body for driving said wheels and said crawler tractors of said wheeled leg assemblies.

7. The robot as claimed in claim 6, further comprising first, second, third and fourth main shafts which are disposed concentrically one around the other and which are mounted on each of said opposite sides of said robot body, said first main shaft having one end provided with a first driven gear driven by said first motor, said second main shaft being inserted into said first main shaft and having one end which extends outwardly of said first driven gear and which has a second driven gear driven by said third motor, said third main shaft being inserted into said second main shaft and having one end which extends outwardly of said second driven gear and which has a third driven gear driven by said fourth motor, said fourth main shaft being inserted into said third main shaft and having one end which extends outwardly of said third driven gear and which has a fourth driven gear driven by said second motor.

8. The robot as claimed in claim 7, wherein each of said lift arms is mounted integrally to another end of said first main shaft for simultaneous rotation therewith.

9. The robot as claimed in claim 8, wherein each of said lift arms carries at said second end thereof a support arm shaft parallel to said first main shaft, said fourth main shaft further having at another end thereof a third output gear to drive said support arm shaft, one of said leg support arms being mounted rotatably on said support arm shaft.

10. The robot as claimed in claim 9, wherein each of said lift arms further carries a first leg shaft inside said support arm shaft, said second main shaft further having at another end thereof a first output gear to drive said first leg shaft, each of said leg support arms carrying at said diametrically opposite outer ends thereof a pair of parallel second leg shafts, said second leg shafts being driven by said first leg shaft and carrying said housings of said wheeled leg assemblies, respectively.

11. The robot as claimed in claim 10, wherein each of said lift arms further carries a first wheel shaft inserted between said support arm shaft and said first leg shaft, said third main shaft further having at another end thereof a second output gear to drive said first wheel shaft, each of said leg support arms further carrying a pair of second wheel shafts inside said second leg shafts, respectively, said wheeled leg assemblies being mounted on said second wheel shafts, respectively.

12. The robot as claimed in claim 11, wherein each of said wheeled leg assemblies includes a substantially triangular housing which has a mounting end mounted integrally on one of said second wheel shafts and which has two angularly spaced radially outward ends extending outward from said mounting end thereof, a wheel mounted on one of said radially outward ends of said housing, and a crawler tractor mounted on the other one of said radially outward ends of said housing, said housing being turnable along with a corresponding one of said second wheel shafts to place selectively said wheel and said crawler tractor in contact with the ground.

13. The robot as claimed in claim 12, wherein said housing further includes first and second transmission mechanisms driven by a corresponding one of said second wheel shafts and connected to said wheel and said crawler tractor, respectively.

14. The robot as claimed in claim 13, wherein said crawler tractor includes a plurality of sprocket rollers mounted to said housing of a corresponding one of said wheeled leg assemblies, and a sprocket chain passing over and engaging said sprocket rollers, said second transmission mechanism driving said sprocket chain.

15. The robot as claimed in claim 13, wherein said first transmission mechanism includes two transmission wheels.

16. The robot as claimed in claim 13, wherein said first transmission mechanism includes a transmission belt.

17. A robot comprising:

a robot body having two opposite sides;

a pair of lift arms turnable about horizontal axes relative to said robot body, said lift arms having first ends mounted pivotally on said opposite sides of said robot body and second ends extending radially outward from said first ends;

a pair of leg support arms mounted pivotally on said second ends of said lift arms, respectively, for turning about horizontal axes and having two diametrically opposite outer ends; and a pair of wheeled leg assemblies mounted on each of said leg support arms at said outer ends, respectively, said lift arms being turnable upward or downward from said leg support arms to lift or lower said robot body.

* * * * *